US010428892B2

(12) United States Patent
Oniwa et al.

(10) Patent No.: US 10,428,892 B2
(45) Date of Patent: Oct. 1, 2019

(54) ANTIVIBRATION DEVICE

(71) Applicant: TOYO TIRE & RUBBER CO., LTD., Itami-shi, Hyogo (JP)

(72) Inventors: Tatsuya Oniwa, Itami (JP); Hiroto Koba, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 15/860,790

(22) Filed: Jan. 3, 2018

(65) Prior Publication Data

US 2018/0245653 A1    Aug. 30, 2018

(30) Foreign Application Priority Data

Feb. 24, 2017    (JP) .................................. 2017-033352

(51) Int. Cl.
*F16F 7/00* (2006.01)
*F16F 1/38* (2006.01)
*F16F 15/08* (2006.01)

(52) U.S. Cl.
CPC .............. *F16F 1/3828* (2013.01); *F16F 1/38* (2013.01); *B60G 2204/4103* (2013.01); *F16F 1/3856* (2013.01); *F16F 15/08* (2013.01); *F16F 2230/02* (2013.01)

(58) Field of Classification Search
CPC .......... F16F 1/38; F16F 1/3807; F16F 1/3814; F16F 1/3828
See application file for complete search history.

(56) References Cited

U.S. PATENT DOCUMENTS

| | | | | |
|---|---|---|---|---|
| 5,301,414 | A | * | 4/1994 | Gautheron ............... B21J 9/025 29/446 |
| 8,979,082 | B2 | * | 3/2015 | Makino .................. B60G 7/001 267/140.12 |
| 2002/0053494 | A1 | * | 5/2002 | Nakamura ................ F16F 9/38 188/322.12 |
| 2005/0138787 | A1 | * | 6/2005 | Katoh ...................... B21J 9/025 29/451 |
| 2008/0196987 | A1 | * | 8/2008 | Niwa ..................... F16F 1/3828 188/379 |
| 2013/0285298 | A1 | * | 10/2013 | Nakamura ................ F16F 1/38 267/141 |
| 2014/0339749 | A1 | * | 11/2014 | Saito .......................... 267/141.1 |

FOREIGN PATENT DOCUMENTS

JP    2006-220208 A    8/2006

OTHER PUBLICATIONS

Office Action dated May 21, 2019, issued in counterpart CN Application No. 201711314496.X, with English translation (11 pages).

* cited by examiner

*Primary Examiner* — Nicholas J Lane
(74) *Attorney, Agent, or Firm* — Westerman, Hattori, Daniels & Adrian, LLP

(57) ABSTRACT

An antivibration device is equipped with an inner sleeve having a diameter expansion portion, an outer sleeve, an antivibration base body, and an annular stopper. The stopper is equipped with a first portion where a first distance from the center of the attaching hole to an inner peripheral surface of the attaching hole is set to be smaller than a maximum value of an outer radius of the diameter expansion portion, and a second portion where a second distance from the center to the inner peripheral surface of the attaching hole is set to be larger than the first distance.

13 Claims, 7 Drawing Sheets

ANTIVIBRATION DEVICE

TECHNICAL FIELD

The present invention relates to an antivibration device with an annular stopper attached onto an inner sleeve.

BACKGROUND ART

Heretofore, there have been known antivibration devices wherein an antivibration base body constituted by a rubber-like elastic body couples an inner sleeve and an outer sleeve. Of the antivibration devices, there is one wherein the outer sleeve is press-fitted in a bracket on a vibration source side or the like to be secured and wherein the inner sleeve is secured by bolts or the like to mating members of a vibration receiving side or the like (Patent Literature 1). An annular stopper is fitted on one end portion of the inner sleeve, so that the collision between an end portion of the outer sleeve and the mating member is cushioned by the stopper. Patent Literature 1 describes that in order to make the stopper difficult to come off the inner sleeve until the inner sleeve is secured to the mating members, one end portion of the inner sleeve is expanded in diameter after the stopper is fitted on the one end portion of the inner sleeve.

CITATION LIST

Patent Literature

[Patent Literature 1] JP-A No. 2006-220208

SUMMARY OF INVENTION

Technical Problem

However, in the aforementioned related art, a restriction is imposed on the order of manufacturing steps that the inner sleeve is expanded in diameter after the inner sleeve is inserted into an inner peripheral side of the stopper.

The present invention has been made in order to address the aforementioned problem, and an object of the present invention is to provide an antivibration device capable of improving the degree of freedom of the order of the manufacturing steps.

Solution to Problem

In order to accomplish this object, an antivibration device of the present invention is equipped with an inner sleeve having a first end and a second end in an axial direction and having a diameter expansion portion being annular in a radial section, the diameter expansion portion being expanded in diameter toward the first end at an outer peripheral surface on the first end side, an outer sleeve disposed on an outer peripheral side of the inner sleeve, an antivibration base body constituted by a rubber-like elastic body and coupling an outer peripheral surface of the inner sleeve to an inner peripheral surface of the outer sleeve, and an annular stopper being flexurally deformable and having at its center an attaching hole into which the first end side of the inner sleeve is inserted. The stopper is equipped with a first portion where a first distance from the center of the attaching hole to an inner peripheral surface of the attaching hole is set to be smaller than a maximum value of an outer radius of the diameter expansion portion, and a second portion where a second distance from the center to the inner peripheral surface of the attaching hole is set to be larger than the first distance.

Advantageous Effect of Invention

According to the antivibration device described in a first aspect, at the first portion of the stopper, the first distance from the center of the attaching hole to the inner peripheral surface of the attaching hole is set to be smaller than the maximum value of the outer radius of the diameter expansion portion. Thus, once the inner sleeve is inserted into the attaching hole of the stopper, the diameter expansion portion can make the stopper difficult to come off the inner sleeve. At the second portion of the stopper, the second distance from the center of the attaching hole to the inner peripheral surface of the attaching hole is set to be larger than the first distance. By the good use of a dimensional difference between the first distance and the second distance, the stopper is flexurally deformed, and thus, the diameter expansion portion being the annular shape in a radial section and expanded in diameter beforehand at the outer peripheral surface on the first end side of the inner sleeve can be made to be inserted easily into the attaching hole of the stopper. As a result, since restriction is not imposed on the order of an expansion step of forming the diameter expansion portion and an insertion step of inserting the inner sleeve into the attaching hole, an improvement can be made in the degree of freedom of the order of manufacturing steps for the antivibration device.

According to the antivibration device in a second aspect, the attaching hole is equipped with a plurality of slits which are provided to extend in directions away from the center of the attaching hole. An inner peripheral side of the stopper is divided by the plurality of slits in a circumferential direction. Regions between the slits are the first portion. Further, a region being on a side remote from the center of the attaching hole beyond the slits is the second portion. Since the slits can make the flexural defamation of the first portion difficult to be prevented by the second portion, it is possible to insert the diameter expansion portion into the attaching hole more easily. As a result, in addition to the advantageous effect of the first aspect, it is possible to improve the workability at the insertion step of inserting the diameter expansion portion into the attaching hole.

According to the antivibration device described in a third aspect, the stopper is equipped with a circumferential groove portion which is provided to be recessed on at least one of a first end surface on the first end side and a second end surface on the second end side and to extend in the circumferential direction. Thus, since the stopper is enabled to be flexurally deformed easily with the circumferential groove portion as a starting point, the diameter expansion portion can be inserted easily into the attaching hole. As a result, in addition to the advantageous effect of the first aspect, it is possible to improve the workability at the insertion step of inserting the diameter expansion portion into the attaching hole.

According to the antivibration device described in a fourth aspect, the circumferential groove portion includes a first circumferential groove portion provided on the second end surface. An axial end portion on the first end side of the outer sleeve faces the first circumferential groove portion in the axial direction of the outer sleeve. Since the first circumferential groove portion makes the axial end portion on the first end side of the outer sleeve difficult to bite into the stopper, the durability of the stopper can be improved in addition to the advantageous effect of the third aspect.

According to the antivibration device described in a firth aspect, the circumferential groove portion includes a second circumferential groove portion which is provided on the second end surface and which is on a radially outer side than the outer sleeve. Thus, the first end side of a bracket with the outer sleeve press-fitted therein can be made to face the second circumferential groove portion in the axial direction. Therefore, since the second circumferential groove portion can make the bracket difficult to bite into the stopper, the durability of the stopper can be improved in addition to the advantageous effect of the third aspect.

According to the antivibration device described in a sixth aspect, since the circumferential groove portion is provided on the first end surface and the second end surface at the same position, it is possible to eliminate the difference between the inside and outside of the stopper. As a result, in addition to the advantageous effect of the third aspect, it is possible, when the stopper is attached onto the inner sleeve, to exclude the time to confirm whether to be the inside or the outside of the stopper, and to prevent a mistake about inside and outside from occurring.

According to the antivibration device described in a seventh aspect, since a protruding portion protrudes from the first end surface of the stopper, the contact between a mating member with the first end of the inner sleeve secured thereto and the stopper can be made to be partly or stepwise. Thus, it is possible to restrain abnormal noise caused by the contact between the mating member and the stopper.

Furthermore, the protruding portion is disposed to be shifted radially relative to the circumferential groove portion provided on the second end surface. Thus, the flexural defamation of the stopper with a starting point at the circumferential groove portion can be made to be difficult to be prevented by the protruding portion. As a result of these, it is possible to restrain abnormal noise caused by the contact between the mating member and the stopper and to restrain workability from being lowered at the insertion step of inserting the diameter expansion portion into the attaching hole of the stopper.

According to the antivibration device described in an eighth aspect, a radial groove portion recessed on at least one of the first end surface on the first end side and the second end surface on the second end side is provided on the stopper to extend radially away from the center of the attaching hole. Thus, since the stopper is enabled to be easily stretchable in the circumferential direction at the position of the radial groove portion, the diameter expansion portion can be inserted into the attaching hole more easily. As a result, in addition to the advantageous effect of the first aspect, it is possible to improve the workability at the insertion step of inserting the diameter expansion portion into the attaching hole.

According to the antivibration device described in a ninth aspect, when a part of the inner sleeve is expanded in diameter to form the diameter expansion portion with the inner sleeve and the outer sleeve coupled by the antivibration base body, the antivibration base body and a restriction portion are in a non-adherent state. Thus, in addition to the advantageous effect of the first aspect, it is possible to make smaller a stress which is exerted on an adhesive layer of the antivibration base body at the time of the diameter expansion of the inner sleeve.

According to the antivibration device described in a tenth aspect, an annular flange protrudes radially from an axial end portion on the second end side of the outer sleeve. Since the maximum value of the outer radius at the diameter expansion portion is set to be smaller than an outer radius of the outer sleeve, the outer sleeve can be press-fitted in the bracket from the first end side. Since a maximum value of the distance from the center of the attaching hole to the outer peripheral surface of the stopper is set to be larger than the outer radius of the outer sleeve, the stopper is able to cushion the collision between the bracket with the outer sleeve inserted to be secured thereto and the mating members to which the first end and the second end of the inner sleeve are secured.

Further, the maximum value of the distance from the center of the attaching hole to the outer peripheral surface of the stopper is set to be larger than the outer radius of the outer sleeve. Thus, before inserting the inner sleeve into the attaching hole, it is necessary to press-fit the outer sleeve in the bracket. Here, if the diameter expansion portion were formed with the inner sleeve inserted into the stopper, the diameter expansion portion would be required to be formed with the outer sleeve press-fitted in the bracket, and thus, further restriction would be imposed on the order of the manufacturing/assembling steps for the antivibration device. On the contrary, since the second portion enables the diameter expansion portion to be inserted easily into the stopper, it is possible to mitigate the restriction on the order of a forming step of forming the diameter expansion portion and a press-fitting step of press-fitting the outer sleeve in the bracket. As a result, in addition to the advantageous effect of any of the first to ninth aspects, it is possible to improve the degree of freedom of the order of the manufacturing/assembling steps for the antivibration device.

DESCRIPTION OF EMBODIMENTS

Figure 1:
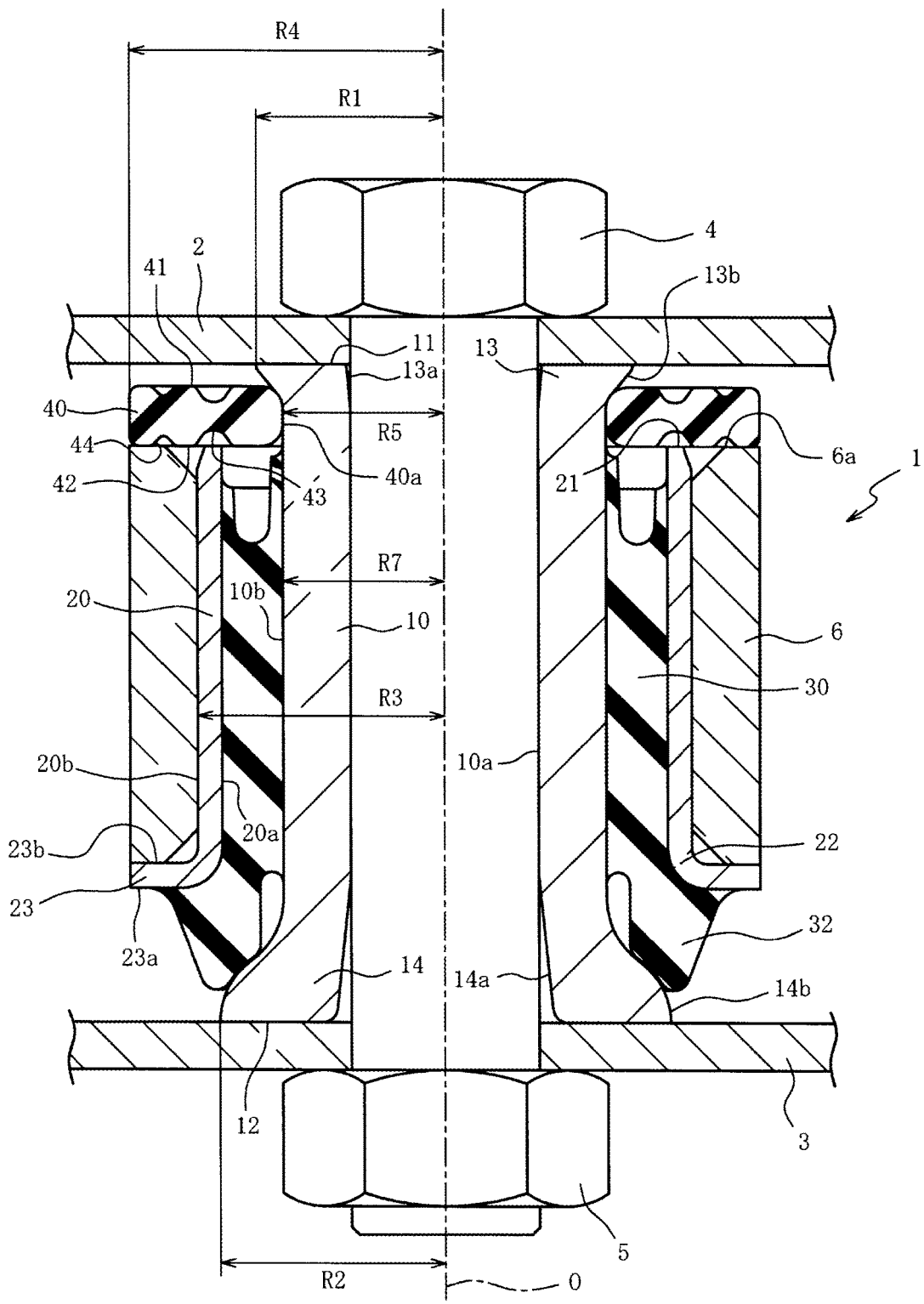
FIG. 1 is a sectional view of an antivibration device in a first embodiment according to the present invention.

Hereinafter, preferred embodiments of the present invention will be described with reference to the accompanying drawings. First of all, an antivibration device 1 in a first embodiment according to the present invention will be described with reference to FIG. 1. FIG. 1 is a sectional view of the antivibration device 1. Incidentally, FIG. 1 shows a section of the antivibration device 1 including an axis O.

As shown in FIG. 1, the antivibration device 1 is a bushing provided in a suspension system of a motor vehicle. The antivibration device 1 is one that connects mating members 2, 3 being a vibration receiving side such as a vehicle body to a bracket 6 (a link connected to a road wheel) being a vibration source side to restrain the transmission of vibration from the vibration source side to the vibration receiving side. Incidentally, the mating members 2, 3 may be made as the vibration source side, and the bracket 6 may be made as the vibration receiving side.

The antivibration device 1 is equipped with an inner sleeve 10 having a first end 11 and a second end 12 in the axial direction, an outer sleeve 20 coaxially disposed on the outer peripheral side of the inner sleeve 10 with a space therebetween, an antivibration base body 30 constituted by a rubber-like elastic body and coupling the inner sleeve 10 to the outer sleeve 20, and an annular stopper 40 attached to the first end 11 side of the inner sleeve 10.

The inner sleeve 10 is a cylindrical member taking its center on the axis O. The inner sleeve 10 is constituted by a rigid material such as a steel material, an aluminum alloy. With the inner sleeve 10 put between a pair of mating members 2, 3, a bolt 4 is inserted into the inner peripheral side of the inner sleeve 10 and through holes of the mating members 2, 3. Then, a nut 5 is fastened onto the bolt 4, whereby the inner sleeve 10 is attached to the mating members 2, 3. Incidentally, without being limited to the case that the inner sleeve 10 is attached to the mating members 2, 3 by means of the bolt 4 and the nut 5, the inner sleeve 10 may be attached to the mating members 2, 3 by the use of a shaft-like member such as a rivet.

The inner sleeve 10 is equipped with a first diameter expansion portion 13 expanded in diameter toward the first end 11 and a second diameter expansion portion 14 expanded in diameter toward the second end 12. Incidentally, the inner peripheral surface and the outer peripheral surface of the inner sleeve 10 are respectively the inner peripheral surface 10a and the outer peripheral surface 10b each parallel to the axis O between the first diameter expansion portion 13 and the second diameter expansion portion 14.

The first diameter expansion portion 13 is a region where the inner sleeve 10 is plastically deformed from the first end 11 to a predetermined portion. The first diameter expansion portion 13 is an annular shape in a radial section orthogonal to the axis O. The first diameter expansion portion 13 has the inner peripheral surface 13a and the outer peripheral surface 13b expanded in diameter toward the first end 11. The second diameter expansion portion 14 is a region where the inner sleeve 10 is plastically deformed from the second end 12 to a predetermined portion. The second diameter expansion portion 14 is an annular shape in a radial section orthogonal to the axis O. The second diameter expansion portion 14 has an inner peripheral surface 14a and an outer peripheral surface 14b expanded in diameter toward the second end 12. A maximum value R1 (hereafter referred to as "maximum radius R1") of the outer radius of the first diameter expansion portion 13 is set to be smaller than a maximum value R2 (hereafter referred to as "maximum radius R2") of the outer radius of the second diameter expansion portion 14.

The first diameter expansion portion 13 is formed to increase the thickness (radial dimension) toward the first end 11. The second diameter expansion portion 14 is formed to increase the thickness toward the second end 12. Thus, since the axial ends of the inner sleeve 10 can be increased in area, the surface pressure can be decreased that the axial ends of the inner sleeve 10 receives when coupled to the mating members 2, 3. As a result, it is possible to restrain the depression of the mating members 2, 3 and the buckling of the inner sleeve 10.

The outer sleeve 20 is a member taking a cylindrical shape in which the thickness (radial dimension) having the axis O as its center is almost constant. The outer sleeve 20 is constituted by a rigid material such as a steel material, an aluminum alloy. The outer sleeve 20 is press-fitted into the cylindrical bracket 6 to be attached to the same. The outer sleeve 20 is formed to be shorter than the inner sleeve 10. The outer radius R3 of the outer sleeve 20 is set to be larger than the maximum radius R1 of the first diameter expansion portion 13 and the maximum radius R2 of the second diameter expansion portion 14. Incidentally, the outer radius R3 of the outer sleeve 20 may be smaller than the maximum radius R2 of the second diameter expansion portion 14.

An axial end portion 21 on the first end 11 side of the outer sleeve 20 is formed in a tapered shape. Thus, the outer sleeve 20 can be easy to be press fitted in the bracket 6. An annular flange 23 protrudes radially outward from an axial end portion 22 on the second end 12 side of the outer sleeve 20. The flange 23 is connected to the axial end portion 22 of the outer sleeve 20 and is formed to be almost orthogonal to the axis O. An axial end surface 23a of the flange 23 continues to the inner peripheral surface 20a of the outer sleeve 20. An axial end surface 23b of the flange 23 continues to the outer peripheral surface 20b of the outer sleeve 20.

When the outer sleeve 20 is press-fitted in the bracket 6 from the axial end portion 21, the axial end surface 23b of the flange 23 comes into contact with the bracket 6. Thus, the outer sleeve 20 is positioned relative to the bracket 6. The axial dimension of the bracket 6 is set to the same as the dimension from the axial end surface 23b of the flange 23 to the axial end portion 21 of the outer sleeve 20. Thus, when the outer sleeve 20 is press-fitted in the bracket 6 to make the bracket 6 contact the flange 23, the axial end portion on the first end 11 side of the bracket 6 and the axial end portion 21 of the outer sleeve 20 are located on the same plane orthogonal to the axial O.

The antivibration base body 30 is an almost cylindrical member constituted by a rubber-like elastic body and coupling the inner sleeve 10 to the outer sleeve 20. The antivibration base body 30 is adhered through vulcanization to the outer peripheral surface 10b of the inner sleeve 10 and is also adhered through vulcanization to the inner peripheral surface 20a of the outer sleeve 20 and the axial end surface 23a of the flange 23. Further, the antivibration base body 30 is not adhered to the outer peripheral surface 13b of the first diameter expansion portion 13 and the outer peripheral surface 14b of the second diameter expansion portion 14.

The antivibration base body 30 is equipped with an annular restriction portion 32 protruding from between the inner sleeve 10 and the outer sleeve 20 and from the flange 23 toward the second diameter expansion portion 14. The restriction portion 32 is a region for restraining the relative displacement in the axial direction between the inner sleeve 10 and the outer sleeve 20 when a force is exerted from the second diameter expansion portion 14. Since an axial load inputted to the inner sleeve 10 or the outer sleeve 20 exerts a force from the first diameter expansion portion 13 to the restriction portion 32, it is possible to increase the spring constant in the axial direction of the antivibration device 1.

Figure 2:
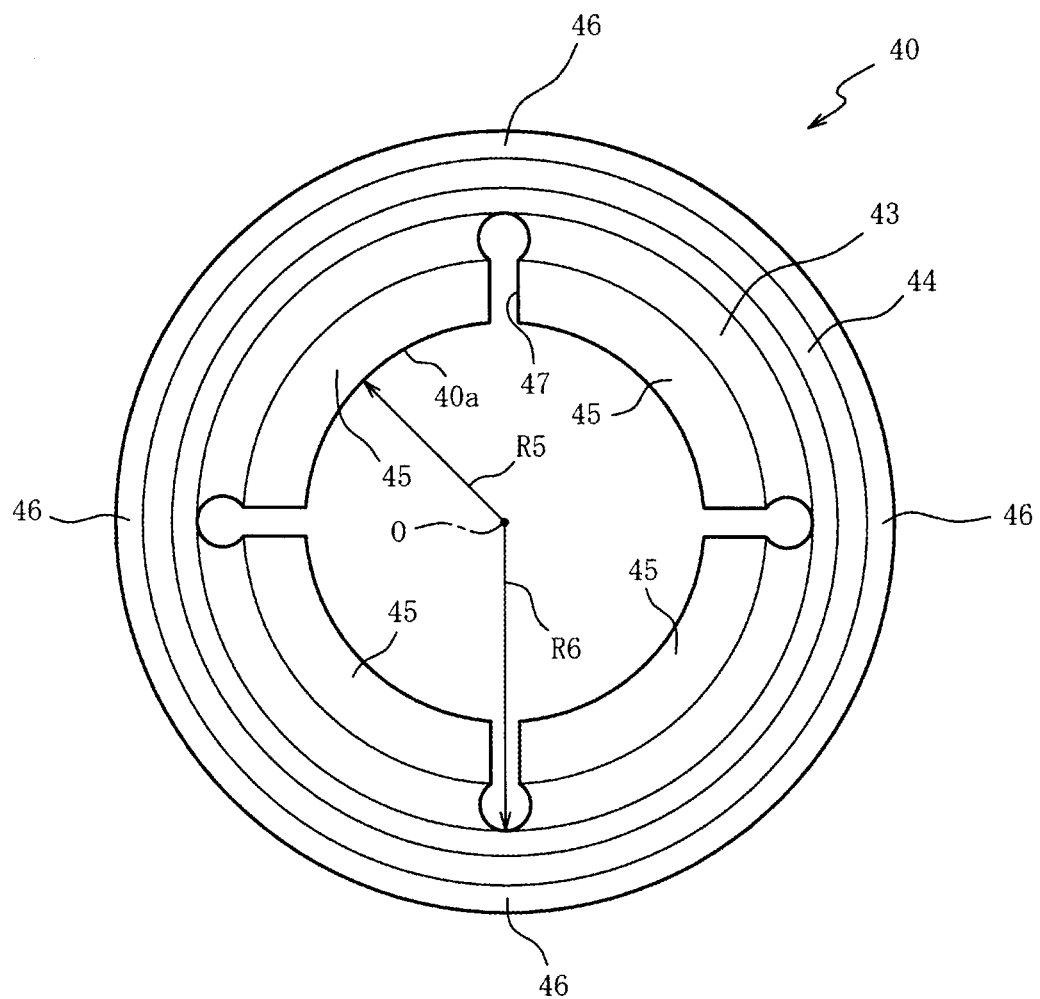
FIG. 2 is a plan view of a stopper.

Next, with reference to FIG. 2 in addition to FIG. 1, the stopper 40 will be described. FIG. 2 is a plan view of the stopper 40. As shown in FIG. 1 and FIG. 2, the stopper 40 is a plate-like member for cushioning the collision between the outer sleeve 20 moved relative to the inner sleeve 10 and the mating member 2. The stopper 40 is provided at its center with an attaching hole 40a for insertion of the inner sleeve 10 thereinto and is formed in an annular shape. The center of the annular stopper 40, that is, the center of the attaching hole 40a coincides with the axis O of the inner sleeve 10 and the outer sleeve 20 with the stopper 40 fitted on the inner sleeve 10. Since the outer radius R4 of the stopper 40 (the maximum value of the direct distance from the axis O to the outer peripheral surface of the stopper 40) is larger than the outer radius R3 of the outer sleeve 20, the stopper 40 is also able to cushion the collision between the bracket 6 and the mating member 2.

The stopper 40 is constituted by a rubber-like elastic body. Incidentally, the material of the stopper 40 may suffice to be a flexurally deformable material without being limited to the rubber-like elastic body. As the flexurally deformable material besides the rubber-like elastic body, there may be recited, for example, a synthetic resin, a fabric or a compound thereof.

The stopper 40 is equipped with a first circumferential groove portion 43 and a second circumferential groove portion 44 which are recessed on each of a first end surface 41 on the first end 11 side and a second end surface 42 on the second end 12 side, a first portion 45 where a first distance R5 on a straight line from the axis (the center) O to an inner peripheral surface of the attaching hole 40a is set to be smaller than the maximum radius R1 of the first diameter expansion portion 13, and a second portion 46 where a second distance R6 on a straight line from the axis O to the inner peripheral surface of the attaching hole 40a is set to be larger than the first distance R5 at the first portion 45.

The first circumferential groove portion 43 is an annular groove formed on the whole circumference of the stopper 40 and placing its center on the axis O. In the state that the stopper 40 is fitted onto the inner sleeve 10, the first circumferential groove portion 43 coincides with the axial end portion 21 of the outer sleeve 20 in radial position and is disposed radially outside (at a position separated from the axis O beyond) the first diameter expansion portion 13.

The second circumferential groove portion 44 is an annular groove formed on the whole circumference of the stopper 40 and placing its center on the axis O. The second circumferential groove portion 44 is disposed radially outside (at a position separated from the axis O beyond) the first circumferential groove portion 43. In the state that the stopper 40 is fitted onto the inner sleeve 10, the second circumferential groove portion 44 coincides with a corner 6a of the axial end portion of the bracket 6 in radial position.

The first circumferential groove portion 43 provided on the second end surface 42 on the outer sleeve 20 side faces the axial end portion 21 of the outer sleeve 20 in the axial direction of the outer sleeve 20. Furthermore, the second circumferential groove portion 44 provided on the second end surface 42 faces the corner 6a of the bracket 6 in the axial direction of the outer sleeve 20. Thus, it is possible to make the axial end portion 21 of the outer sleeve 20 and the corner 6a of the bracket 6 difficult to bite into the stopper 40. As a result, it is possible to improve the durability of the stopper 40.

Incidentally, compared with the corner 6a of the bracket 6, the axial end portion 21 of the outer sleeve 20 is large and is an acute angle. For this reason, if the first circumferential groove portion 43 and the second circumferential groove portion 44 were the same in width (radial dimension) and depth (dimension in thickness direction), the axial end portion 21 of the outer sleeve 20 would be easy to bite into the stopper 40. In the present embodiment, since the width and depth of the first circumferential groove portion 43 is larger than the width and depth of the second circumferential groove portion 44, the axial end portion 21 of the outer sleeve 20 can be restrained from becoming easer to bite into the stopper 40 in comparison with the corner 6a of the bracket 6. As a result, it is possible to further improve the durability of the stopper 40.

Further, the first end surface 41 is also provided with the first circumferential groove portion 43 and the second circumferential groove portion 44 at the same positions as those on the second end surface 42, and thus, the inside and outside of the stopper 40 can be made to be identical. This makes it possible to eliminate the difference between the inside and outside of the stopper 40. As a result, when the stopper 40 is attached onto the inner sleeve 10, it is possible to exclude the time to confirm whether to be the inside or the outside of the stopper 40, and to prevent a mistake about inside and outside from occurring. Further, since the first circumferential groove portions 43 and the second circumferential groove portions 44 enable the stopper 40 to contact the mating member 2, the bracket 6 and the outer sleeve 20 partly or stepwise, it is possible to restrain abnormal noise caused by the contact therebetween.

The attaching hole 40a is provided with four slits 47 which are provided to extend radially outward (in directions away from the center O). The slits 47 pierce the stopper 40 in the thickness direction to divide the inner peripheral side of the stopper 40 circumferentially into four. The slits 47 have radially outside ends residing at the first circumferential groove portion 43. The ends of the slits 47 are formed in a round shape in a plain view. Thus, it is possible to prevent the stopper 40 from becoming easy to break from the extreme end of each slit 47 as a starting point.

The first portion 45 includes regions being between the slits 47 and divided by the slits 47 in the circumferential direction. The first distance R5 to the first portion 45 is set to be smaller than the maximum radius R1 of the first diameter expansion portion 13. Thus, the first diameter expansion portion 13 makes the stopper 40 difficult to come off the first end 11 of the inner sleeve 10.

The first distance R5 to the first portion 45 is set to almost the same dimension as an outer radius R7 at the outer peripheral surface 10b of the inner sleeve 10. Thus, the inner peripheral surface of the first portion 45 contacts the outer peripheral surface 10b of the inner sleeve 10 so that the first portion 45 holds the inner sleeve 10 in the radial directions. Thus, it is possible to restrain the stopper 40 from being moved radially relative to the inner sleeve 10. This can keep the state that the first circumferential groove portion 43 faces the axial end portion 21 of the outer sleeve 20 in the axial direction. Furthermore, this can keep the state that the second circumferential groove portion 44 faces the corner 6a of the bracket 6 in the axial direction. Further, since the collision caused by vibration between the inner peripheral surface of the attaching hole 40 and the outer peripheral surface 10b can be prevented, strange noise caused by the collision can be prevented from being generated.

The second portion 46 is a region residing on a radial outside of the slits 47 (the side remote from the axis O beyond the slits 47). Since the second distance R6 to the second portion 46 is longer than the first distance R5 to the first portion 45, the second portion 46 does not contact the outer peripheral surface 10b of the inner sleeve 10. The second distance R6 to the second portion 46 is set to be larger than the maximum radius R1 of the first diameter expansion portion 13.

Figure 3:
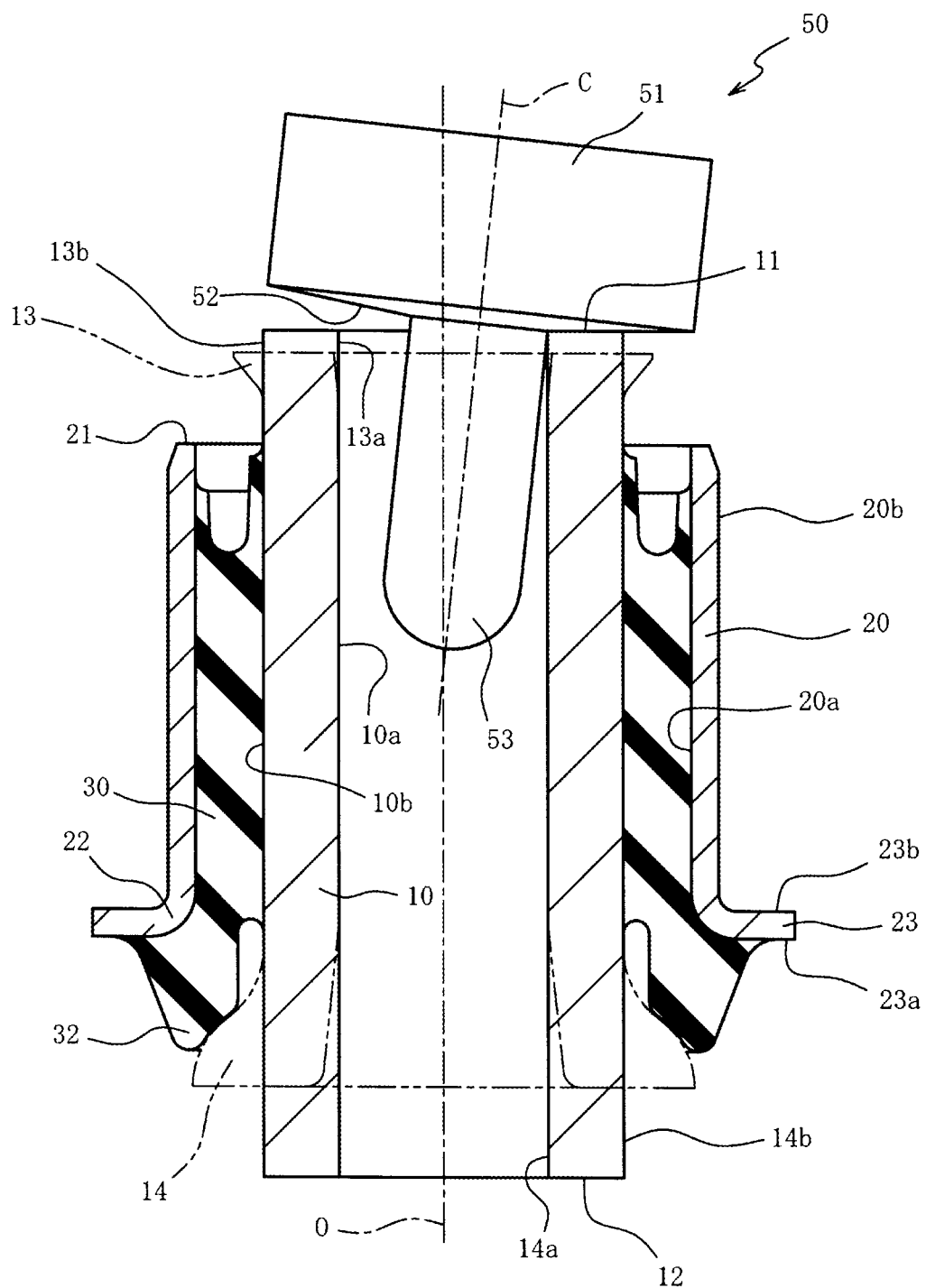
FIG. 3 is a sectional view of the antivibration device showing a diameter expansion step.

Next, with reference to FIG. 3, description will be made regarding a contact pressuring tool 50 for forming the first diameter expansion portion 13 and the second diameter expansion portion 14. FIG. 3 is a sectional view of the antivibration device 1 at a diameter expansion step. As shown in FIG. 3, the contact pressuring tool 50 is a tool made of a steel being higher in strength than the inner sleeve 10 and constituted to be an axial symmetry about its center axis C. The contact pressuring tool 50 is equipped with a column-like tool body 51, a conical contact pressuring surface 52 provided at an end portion on one side of the tool body 51, and a protrusion 53 protruding axially from the center of the contact pressuring surface 52 and taking a circular shape in section. The protrusion 53 takes a semi-circular shape at an end portion, wherein an outer peripheral surface to a tip end is formed in parallel to the center axis C.

Figure 4:
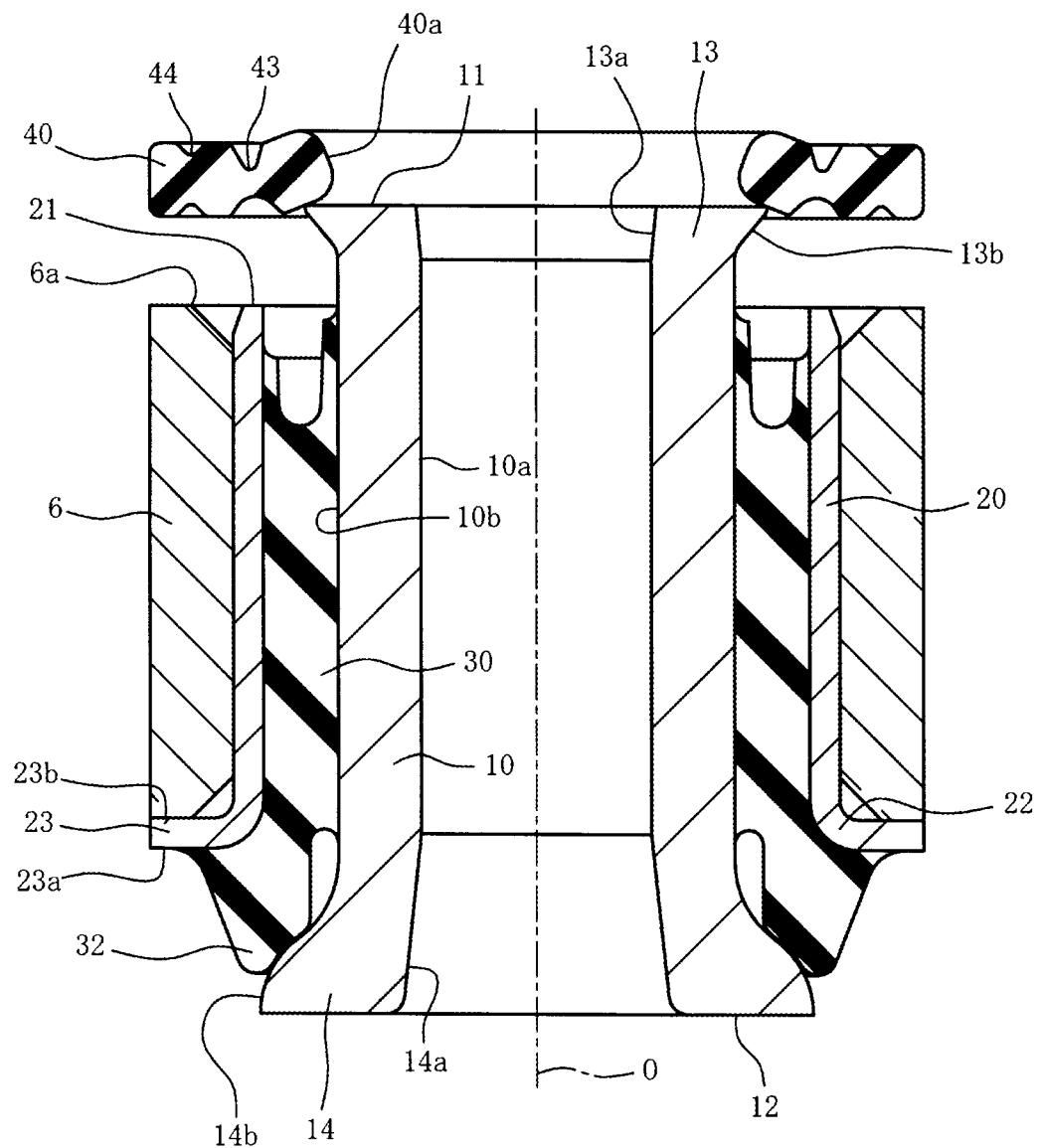
FIG. 4 is a sectional view of the antivibration device showing an insertion step.

Next, a manufacturing method and an assembling method for the antivibration device 1 will be described with reference to FIG. 4 in addition to FIG. 3 FIG. 4 is a sectional view of the antivibration device 1 showing an insertion step. In the beginning, an adhesive is applied to the outer peripheral surface 10b of the inner sleeve 10 and the inner peripheral surface 20a and the axial end surface 23a of the outer sleeve 20. Then, the inner sleeve 10 and the outer sleeve 20 are arranged in a vulcanization foaming mold (not shown) so that the outer sleeve 20 is coaxially positioned at a radial outside of the inner sleeve 10 with a distance therebetween. The antivibration base body 30 is formed through vulcanization to couple the outer peripheral surface 10b of the inner sleeve 10 to the inner peripheral surface 20a and the axial end surface 23a of the outer sleeve 20, whereby the inner sleeve 10 and the outer sleeve 20 are integrated by the antivibration base body 30.

After that, as shown in FIG. 3, the inner sleeve 10, the outer sleeve 20 and the antivibration base body 30 are taken out from the vulcanization forming mold. The inner sleeve 10 in the state of being taken out from the vulcanization forming mold is such that the outlines of the inner peripheral surfaces 10a, 13a, 14a and the outer peripheral surfaces 10b, 13b, 14b in a section including the axis O are linear and parallel to the axis O throughout the whole length from the first end 11 to the second end 12. Thus, the vulcanization forming mold can be simplified, and the inner sleeve 10, the outer sleeve 20 and the antivibration base body 30 can be taken out easily from the vulcanization forming mold.

Then, the protrusion 53 of the contact pressuring tool 50 is inserted into the inner sleeve 10 from the first end 11 side. Thereafter, the contact pressuring tool 50 is turned about the axis O while the contact pressuring surface 52 contacts and pressures the end surface of the inner sleeve 10 in the axial direction with the contact pressuring surface 52 held in parallel to the end surface on the first end 11 side of the inner sleeve 10. As a consequence, the end surface on the first end 11 side of the inner sleeve 10 is axially pressed while being subjected to a pressure contact, whereby the inner sleeve 10 is plastically deformed on the first end 11 side.

Since the inner peripheral surface 13a of the inner sleeve 10 is pressed radially outward by the protrusion 53, the inner peripheral surface 13a and the outer peripheral surface 13b of the inner sleeve 10 are expanded in diameter to form the first diameter expansion portion 13. Likewise, the second end 12 side of the inner sleeve 10 is expanded in diameter by the use of the contact pressuring tool 50 to form the second diameter expansion portion 14.

Thereafter, as shown in FIG. 4, the outer radius R3 of the outer sleeve 20 is larger than the maximum radius R1 of the first diameter expansion portion 13. Therefore, in the state that the first diameter expansion portion 13 is formed, the outer sleeve 20 can be press-fitted in the bracket 6 while the first diameter expansion portion 13 is inserted into the bracket 6. After the press-fitting of the outer sleeve 20 in the bracket 6, the first diameter expansion portion 13 of the inner sleeve 10 is inserted into the attaching hole 40a of the stopper 40 as the inner peripheral side of the stopper 40 is flexurally deformed in the axial direction of the inner sleeve 10, to attach the stopper 40 onto the inner sleeve 10. Thus, the antivibration device 1 assembled to the bracket 6 is obtained. Subsequently, as shown in FIG. 1, the inner sleeve 10 is assembled to the mating members 2, 3 by the bolt 4 and the nut 5, in which state the antivibration device 1 is used.

According to the antivibration device 1 and the manufacturing method/the assembling method for the antivibration device 1, the first diameter expansion portion 13 is inserted into the attaching hole 40a with the stopper 40 flexurally deformed by the good use of the dimensional difference between the first distance R5 to the first portion 45 and the second distance R6 to the second portion 46. That is, the first diameter expansion portion 13 to which the first end 11 of the inner sleeve 10 is expanded beforehand in diameter can be made to be easily inserted into the attaching hole 40a. As a result, the restriction on the order of the diameter expansion step of foaming the first diameter expansion portion 13 and the insertion step of attaching the stopper 40 to the inner sleeve 10 can be precluded, so that the degree of freedom can be improved in the order of manufacturing steps for the antivibration device 1. Thus, it is possible for example to respectively deliver the stopper 40 and the antivibration device 1 which has the first diameter expansion portion 13 formed at the diameter expansion step but does not have the stopper 4 attached thereto and to execute the insertion step at a subsequent step executed at a delivery destination.

Further, the detachment of the stopper 40 from the inner sleeve 10 formed with the first diameter expansion portion 13 can be made to be easy when the stopper 40 is flexurally deformed by the good use of the dimensional difference between the first distance R5 to the first portion 45 and the second distance R6 to the second portion 46. Thus, it is possible, for example, to deliver the antivibration device 1 with the stopper 40 attached after being formed with the first diameter expansion portion 13, to detach the stopper 40 from the inner sleeve 10 at a subsequent step at a delivery destination, and to attach the stopper 40 again onto the inner sleeve 10. In this case, it is possible to make the number of the antivibration devices 1 and the number of the stoppers 40 identical at the time of a delivery and to make the stopper 40 difficult to come off the inner sleeve 10 at the time of the delivery thanks to the first diameter expansion portion 13.

Incidentally, as a matter of course, it is possible to form the first diameter expansion portion 13 with the inner sleeve 10 inserted into the attaching hole 40a. However, since the outer radius R4 of the stopper 40 is larger than the outer radius R3 of the outer sleeve 20, the outer sleeve 20 cannot be press-fitted in the bracket 6 with the stopper 40 attached onto the inner sleeve 10. Therefore, if the first diameter expansion portion 13 were formed with the inner sleeve 10 inserted into the attaching hole 40a, it would be necessary to form the first diameter expansion portion 13 with the outer sleeve 20 press-fitted in the bracket 6. Like this, a further restriction would be imposed on the order of the manufacturing/assembling steps for the antivibration device 1.

On the contrary, by inserting the first diameter expansion portion 13 expanded beforehand in diameter into the attaching hole 40a, it is possible to press-fit the outer sleeve 20 in the bracket 6 after the first diameter expansion portion 13 is formed. Thus, it is possible to mitigate the restriction on the order of a diameter expansion step of expanding the first diameter expansion portion 13 in diameter, an insertion step of attaching the stopper 40 onto the inner sleeve 10 and a press-fitting step of press-fitting the outer sleeve 20 in the bracket 6. As a result, the degree of freedom can be improved in the order of the manufacturing/assembling steps for the antivibration device 1. Thus, for example, after the diameter expansion step at which the first diameter expansion portion 13 is formed, it is possible to deliver the antivibration device 1 with the stopper 40 attached, then to execute the press-fitting step after the stopper 40 is detached from the inner sleeve 10 at a subsequent step at a delivery destination, and to execute the insertion step again.

The regions between the plurality of slits 47 provided to extend radially outward are the first portion 45, and the region radially outside the slits 47 is the second portion 46. Thus, with respect to the inner peripheral surface of the first portion 45, the inner peripheral surface of the second portion 46 is located radially outside in a stepwise manner, so that these inner peripheral surfaces are made to be discontinuous. Thus, when the first diameter expansion portion 13 is inserted into the attaching hole 40a, the flexural defamation on the inner peripheral side of the first portion 45 can be made to be difficult to be prevented by the second portion 46. As a consequence, since the first diameter expansion portion 13 can become further easy to be inserted into the attaching hole 40a, it is possible to improve the workability at the insertion step of inserting the first diameter expansion portion 13 into the attaching hole 40a.

Since the rigidity of the stopper 40 is lowered at the portions where the first circumferential groove portion 43 and the second circumferential groove portion 44 are provided, the stopper 40 can be flexurally deformed easily as the starting points at the first circumferential groove portion 43 and the second circumferential groove portion 44. Thus, since the first diameter expansion portion 13 is enabled to be inserted further easily into the attaching hole 40a, it is possible to further improve the workability at the insertion step.

In particular, where the stopper 40 is flexurally deformed in the axial direction of the inner sleeve 10, the radial inner side whose circumferential length is short is easy to be flexurally deformed. Thus, in the present embodiment, as shown in FIG. 4, the stopper 40 is flexurally deformed as the starting point at the first circumferential groove portion 43. Since the first circumferential groove portion 43 is larger in width and depth than the second circumferential groove portion 44, the rigidity of the stopper 40 is made to be smaller at the first circumferential groove portion 43 than at the second circumferential groove portion 44. Since the rigidity of the portion which is easy to flexurally deformed can be made to be smaller, it is possible to make the first diameter expansion portion 13 easier to be inserted into the attaching hole 40a and hence, to further improve the workability at the insertion step.

Further, the first circumferential groove portion 43 is located outside the first diameter expansion portion 13. Thus, when the stopper 40 is flexurally deformed as the starting point at the first circumferential groove portion 43, the attaching hole 40a of the stopper 40 can be sufficiently expanded relative to the maximum radius R1 of the first diameter expansion portion 13. As a result, the first diameter expansion portion 13 can be made to be inserted further easily into the attaching hole 40a, and hence, the workability at the insertion step can be improved further.

Furthermore, since the slits 47 are provided up to the first circumferential groove portion 43, the first portion 45 and the second portion 46 can be made not to be connected on the inner peripheral side of the starting point where the flexural defamation takes place. Thus, since the first portion 45 can be flexurally deformed almost regardless of the second portion 46, it is possible to flexurally deform the first portion 45 further larger. As a consequence, it is possible to make the first diameter expansion portion 13 inserted further easily into the attaching hole 40a and hence, to further improve the workability at the insertion step.

Since the first diameter expansion portion 13 and the second diameter expansion portion 14 are formed after the foaming by vulcanization of the antivibration base body 30, the inner sleeve 10 can be removed from the vulcanization foaming mold in the axial direction. Thus, it is possible to simplify the vulcanization foaming mold and to ease the removal work from the foaming mold after the vulcanization foaming.

Here, if the first diameter expansion portion 13 and the second diameter expansion portion 14 had the antivibration base body 30 adhered thereto, an anxiety would arise in that at time of the diameter expansion of the inner sleeve 10, a stress exerted on an adhesive layer of the antivibration base body 30 causes the cracks to be made at the adhesive layer of the antivibration base body 30. In the present embodiment, the antivibration base body 30 is adhered through vulcanization to the outer peripheral surface 10b of the inner sleeve 10 between the first diameter expansion portion 13 and the second diameter expansion portion 14, whereas the antivibration base body 30 is not adhered through vulcanization to the outer peripheral surface 13b of the first diameter expansion portion 13 and the outer peripheral surface 14b of the second diameter expansion portion 14. Therefore, the stress exerted on the adhesive layer of the antivibration base body 30 can be made to be smaller when the inner sleeve 10 is expanded in diameter.

Figure 5A:
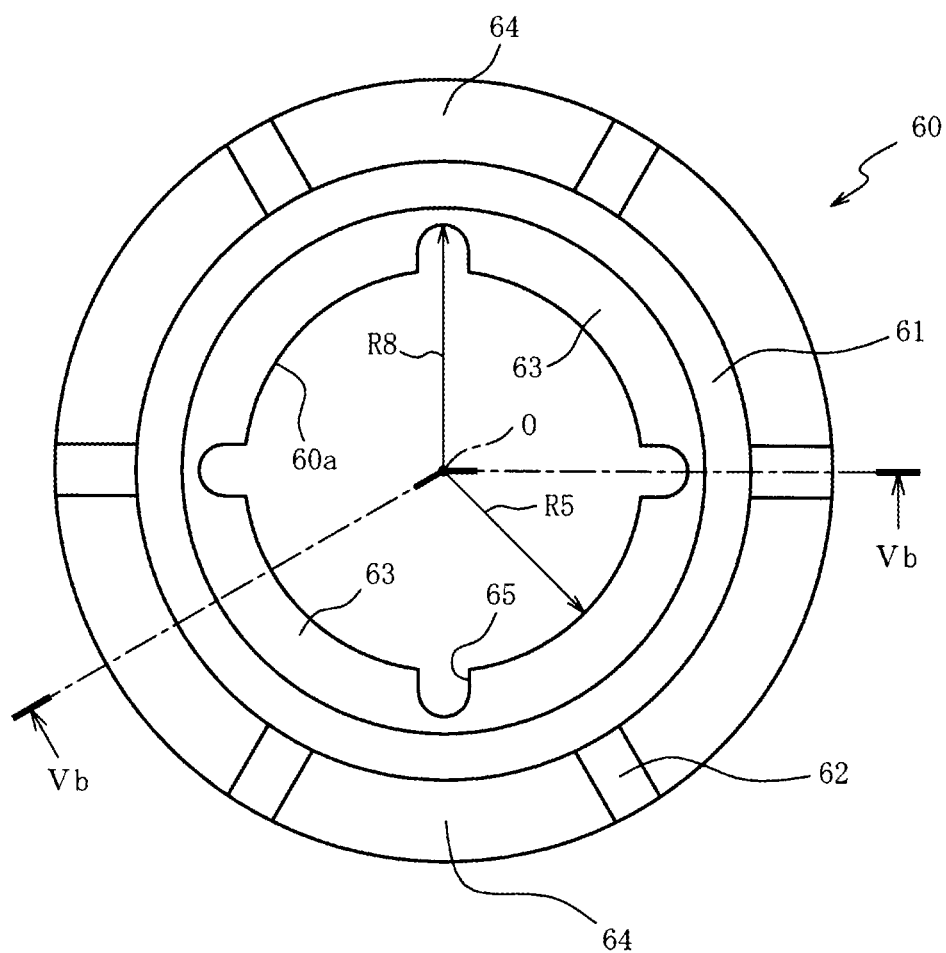
FIG. 5A is a plan view of a stopper in a second embodiment.
Figure 5B:
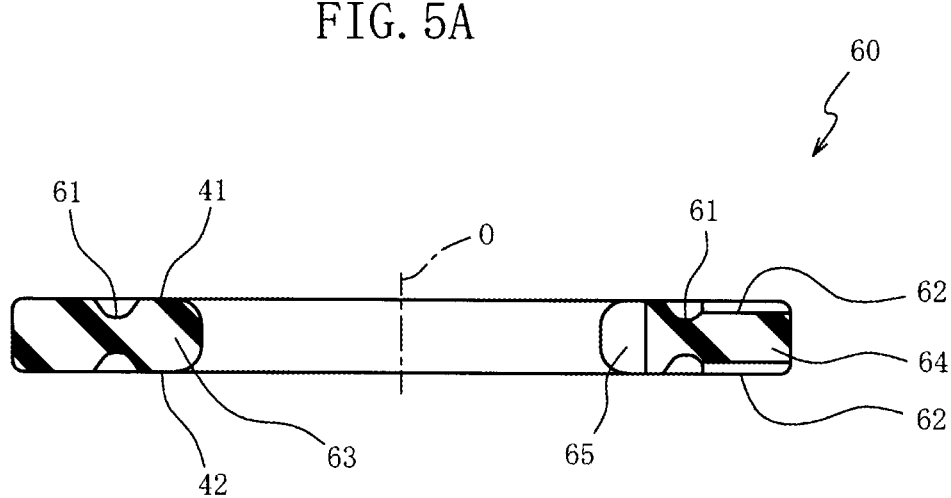
FIG. 5B is a sectional view of the stopper taken along the line Vb-Vb in FIG. 5A.

Next, a second embodiment will be described with reference to FIG. 5A and FIG. 5B. In the first embodiment, description has been made regarding the example wherein the slits 47 are provided up to the first circumferential groove portion 43. In the second embodiment, on the contrary, description will be made regarding an example wherein the slits 65 are located radially inside the circumferential groove portion 61. Incidentally, portions identical to those in the first embodiment will be given the same reference numerals and will hereafter be omitted from being described. FIG. 5A is a plan view of a stopper 60 in the second embodiment. FIG. 5B is a sectional view of the stopper 60 taken along the Vb-Vb line in FIG. 5A.

The stopper 60 shown in FIG. 5A and FIG. 5B is a plate-like member. Like the stopper 40 in the first embodiment, the stopper 60 cushions the collision of the outer sleeve 20 and the bracket 6 moved relative to the inner sleeve 10 with the mating member 2. The stopper 60 is formed in an annular shape with an attaching hole 60a provided at the center for insertion of the inner sleeve 10. The center O of the annular stopper 60 and the attaching hole 60a coincides with the axis O of the inner sleeve 10 and the outer sleeve 20 in the state that the stopper 60 is fitted on the inner sleeve 10. The stopper 60 is constituted by a flexurally deformable material like a rubber-like elastic body, for example.

The stopper 60 is equipped with circumferential groove portions 61 and radial groove portions 62 which are recessed on each of the first end surface 41 and the second end surface 42, a first portion 63 where a first distance R5 from the center O to the inner peripheral surface of the attaching hole 60a is set to be smaller than the maximum diameter R1 of the first diameter expansion portion 13, and a second portion 64 where a second distance R8 from the center O to the inner peripheral surface of the attaching hole 60a is set to be larger than the first distance R5 to the first portion 63. The stopper 60 has the inside and outside formed identically, and thus, when the stopper 60 is attached onto the inner sleeve 10, it is possible to exclude the time to confirm whether to be the inside or the outside of the stopper 60, and to prevent a mistake about inside and outside from occurring. Further, since the circumferential groove portion 61 and the radial groove portion 62 enable the stopper 60 to contact the mating member 2, the bracket 6 and the outer sleeve 20 partly or stepwise, it is possible to restrain abnormal noise caused by the contact therebetween.

The circumferential groove portion 61 is an annular groove formed over the whole circumference of the stopper 60 and placing its center on the center O. Thus, since the rigidity of the stopper 60 can be lowered at the portion where the circumferential groove portion 61 is provided, the stopper 60 can be made to be flexurally deformed easily from the starting point at the circumferential groove portion 61. As a result, since the first diameter expansion portion 13 can be made to be inserted easily into the attaching hole 60a, an improvement can be made in the workability at the insertion step of inserting the first diameter expansion portion 13 into the attaching hole 60a.

The circumferential groove portion 61 coincides with the axial end portion 21 (refer to FIG. 1) of the outer sleeve 20 in radial position. Since the circumferential groove portion 61 provided on the second end surface 42 on the outer sleeve 20 side faces the axial end portion 21 of the outer sleeve 20 in the axial direction, it is possible to make the axial end portion 21 of the outer sleeve 20 difficult to bite into the stopper 60. As a result, it is possible to improve the durability of the stopper 60.

The radial groove portions 62 are grooves provided to extend radially outward (in directions away from the center O) from the circumferential groove portion 61. Thus, since the rigidity of the stopper 60 can be lowered at the portions where the radial groove portions 62 are provided, the stopper 60 is enabled to stretch in the circumferential direction at the positions of the radial groove portions 62. As a result, the stopper 60 is enabled to be stretched in the circumferential direction to increase the first distance R5 to the first portion 63, and thus, the first diameter expansion portion 13 can be made to be inserted easily into the attaching hole 60a. Therefore, an improvement can be made in the workability at the insertion step of inserting the first diameter expansion portion 13 into the attaching hole 60a.

The attaching hole 60a is equipped with four slits 65 provided to extend radially outward. The slits 65 pierce the stopper 60 in the thickness direction to divide the inner peripheral side of the stopper 60 into four in the circumferential direction. The slits 65 have radially outside ends located to be closer to the center O side than the circumferential groove portion 61. The ends of the slits 65 are formed in an arc shape in a plan view. Thus, the stopper 60 can be prevented from becoming easy to break from the starting points at the ends of the slits 65.

The first portion 63 includes regions between the slits 65 and respective portions divided by the slits 65 in the circumferential direction. Since the first distance R5 to the first portion 63 is smaller than the maximum radius R1 of the first diameter expansion portion 13, the first diameter expansion portion 13 can make the stopper 60 difficult to come off the first end 11 of the inner sleeve 10. Further, the first distance R5 to the first portion 63 is set to almost the same dimension as the outer radius R7 of the inner sleeve 10 (refer to FIG. 1). Thus, the inner peripheral surface of the first portion 63 contacts the outer peripheral surface 10b of the inner sleeve 10 so that the first portion 63 holds inner sleeve 10 in the radial directions.

The second portion 64 is a region being radially outside the slits 65. Since the second distance R8 to the second portion 64 is larger than the first distance R5 to the first portion 63, the second portion 64 does not contact the outer peripheral surface 10b of the inner sleeve 10. The second distance R8 to the second portion 64 is set to be larger than the maximum radius R1 of the first diameter expansion portion 13.

Similarly to the first embodiment, the first portion 63 and the second portion 64 enable the stopper 60 to be flexurally deformed by the good use of dimensional difference between the first distance R5 to the first portion 63 and the second distance R8 to the second portion 64, and thus, the first diameter expansion portion 13 expanded in diameter beforehand at the first end 11 of the inner sleeve 10 can be made to be easily inserted into the attaching hole 60a. As a result, since it is possible to preclude the restriction on the order of the expansion step of foaming the first diameter expansion portion 13 and the insertion step of attaching the stopper 60 onto the inner sleeve 10, an improvement can be made in the degree of freedom of the order of the manufacturing steps for the antivibration device.

Figure 6A:
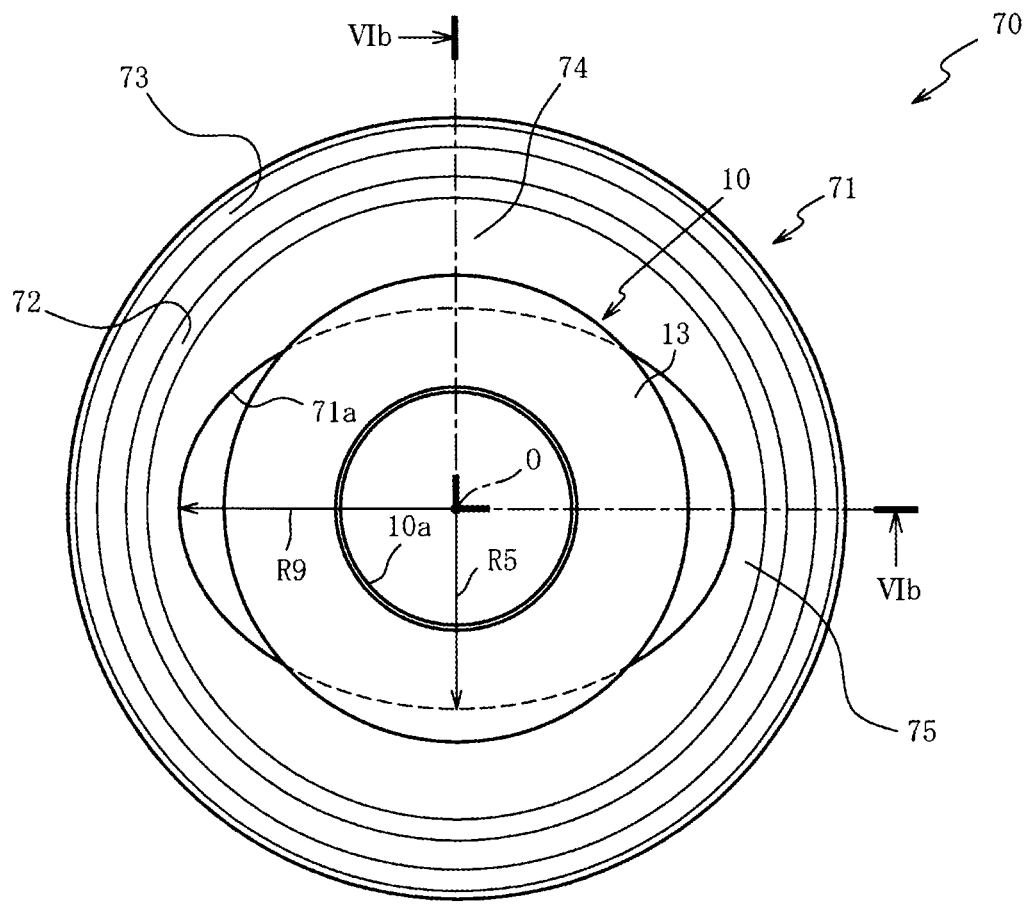
FIG. 6A is a side view of an antivibration device in a third embodiment.

Next, a third embodiment will be described with reference to FIG. 6A and FIG. 6B. The first embodiment has been described regarding the example wherein the attaching hole 40a of the stopper 40 is a circular shape in a plan view. In the third embodiment, on the contrary, description will be made regarding an example wherein an attaching hole 71a of a stopper 71 is an elliptic shape in a plan view. Incidentally, portions identical to those in the first embodiment will be given the same reference numerals and will hereafter be omitted from being described. FIG. 6A is a plan view of an antivibration device 70 in the third embodiment, and FIG. 6B is a sectional view of the antivibration device 70 taken along the line VIb-VIb in FIG. 6A.

Figure 6B:
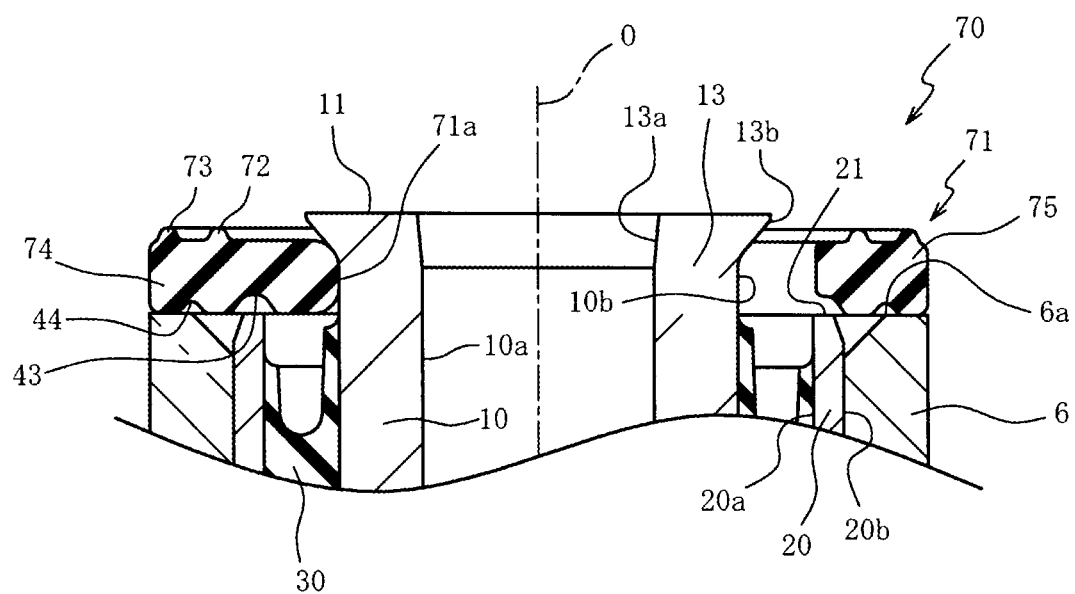
FIG. 6B is a sectional view of the antivibration device taken along the line VIb-VIb in FIG. 6A.

As shown in FIG. 6A and FIG. 6B, the antivibration device 70 differs from the antivibration device 1 of the first embodiment in the shape of the stopper 71 but is identical in other constructions. The stopper 71 is an annular region for cushioning the collision of the outer sleeve 20 and the bracket 6 moved relative to the inner sleeve 10 with the mating member 2 (refer to FIG. 1). The outer periphery of the stopper 71 is a circular shape in a plan view.

The stopper 71 is provided at its center with an attaching hole 71a for insertion of the inner sleeve 10 thereinto and is formed in an annular shape. The center O of the annular stopper 71 coincides with the axis O of the inner sleeve 10 and the outer sleeve 20 in the state that the stopper 71 is fitted on the inner sleeve 10. The stopper 71 is constituted by a flexurally deformable material like a rubber-like elastic body, for example.

The attaching hole 71a is formed in an elliptic shape in a plan view. The stopper 71 is equipped with protruding portions 72, 73 protruding from the first end surface 41, a first circumferential groove portion 43 and a second circumferential groove portion 44 recessed on the second end surface 42, first portions 74 where a first distance R5 from the center O to the inner peripheral surface of the attaching hole 71a is set to be smaller than the maximum diameter R1 of the first diameter expansion portion 13, and second portions 75 where a second distance from the center O to the inner peripheral surface of the attaching hole 71a is set to be larger than the first distance R5 to the first portions 74.

The protruding portions 72, 73 are each an annular protrusion formed over the whole circumference of the stopper 71 with its center on the center O. Since the protruding portions 72, 73 enable the stopper 71 to contact the mating member 2 partly or stepwise, it is possible to restrain abnormal noise caused by the contact therebetween.

The protruding portions 72, 73 are arranged to be shifted in the radial direction from the first circumferential groove portion 43 and the second circumferential groove portion 44. Thus, the flexural deformation of the stopper 71 with the starting points at the first circumferential groove portion 43 and the second circumferential groove portion 44 can be made to be difficult to be prevented by the protruding portions 72, 73.

The first portions 74 are a pair of regions on a minor axis side of the attaching hole 71a being the elliptic shape. Since the first distance R5 to the first portions 74 is smaller than the maximum radius R1 of the first diameter expansion portion 13, the first diameter expansion portion 13 makes the stopper 71 difficult to come off the first end 11 of the inner sleeve 10. Further, the first distance R5 to the first portions 74 is set to almost the same dimension as the outer radius R7 of the inner sleeve 10. Thus, the inner peripheral surfaces at the first portions 74 contact the outer peripheral surface 10b of the inner sleeve 10 so that the first portions 74 hold the inner sleeve 10 in radial directions.

The second portions 75 are regions on the major axis side of the attaching hole 71a being the elliptic shape and are regions where the inner peripheral surfaces do not contact the inner sleeve 10. Similarly to the first and second embodiments, the first portions 74 and the second portions 75 enable the stopper 71 to be flexurally deformed by the good use of dimensional difference between the first distance R5 and the second distance, and thus, the first diameter expansion portion 13 expanded in diameter beforehand at the first end 11 of the inner sleeve 10 can be made to be easily inserted into the attaching hole 71a. As a result, since it is possible to preclude the restriction on the order of the expansion step of foaming the first diameter expansion portion 13 and the insertion step of attaching the stopper 71 onto the inner sleeve 10, an improvement can be made in the degree of freedom of the order of the manufacturing steps for the antivibration device 70.

A maximum value R9 of the second distance to the second portions 75 is set to be larger than the maximum value R1 of the first diameter expansion portion 13. Thus, in the state that one of the pair of the first portions 74 is held in contact with the outer peripheral surface 10b of the inner sleeve 10, the first diameter expansion portion 13 is inserted into the attaching hole 71a while the stopper 71 is stretched in the minor axis direction of the elliptic shape, and thus, it is possible to make the other of the pair of the first portions 74 contact the outer peripheral surface 10b. In comparison with the case that the inner peripheral side of the stopper 71 is flexurally deformed in the axial direction of the inner sleeve 10 to attach the stopper 71 onto the inner sleeve 10, the way of flexurally deforming the stopper 71 in the radial direction to attach the stopper 71 onto the inner sleeve 10 can make small the force required to attach the stopper 71. As a result, since the first diameter expansion portion 13 can be made to be easily inserted into the attaching hole 71a, an improvement is made in the workability at the insertion step of inserting the first diameter expansion portion 13 into the attaching hole 71a.

Figure 7A:
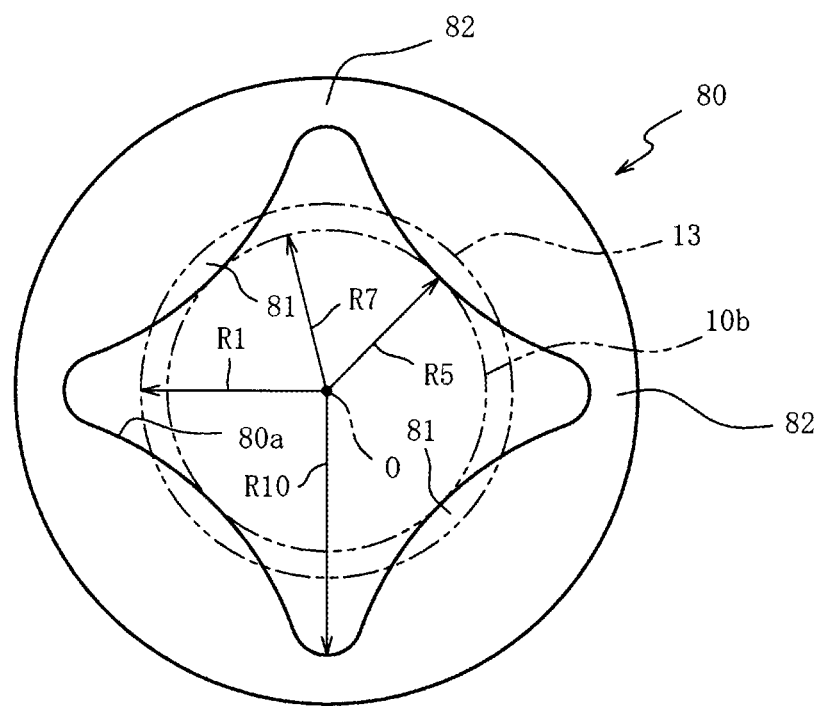
FIG. 7A is a plan view of a stopper in a fourth embodiment.

Next, a fourth embodiment will be described with reference to FIG. 7A. In the first embodiment, description has been made regarding the example wherein the attaching hole 40a of the stopper 40 is a circular shape in a plan view. In the fourth embodiment, on the contrary, description will be made regarding an example wherein in a plan view, an attaching hole 80a of a stopper 80 takes a quadrilateral shape with each side curved convexly toward a facing side. Incidentally, portions identical to those in the first embodiment will be given the same reference numerals and will hereafter be omitted from being described. FIG. 7A is a plan view of the stopper 80 in the fourth embodiment. In FIG. 7A, the first diameter expansion portion 13 at the first end 11 and the outer peripheral surface 10b of the inner sleeve 10 are shown by two-dot-chain lines.

The stopper 80 shown in FIG. 7A is an annular region. Like the stopper 40 in the first embodiment, the stopper 80 cushions the collision of the outer sleeve 20 and the bracket 6 moved relative to the inner sleeve 10 with the mating member 2. The outer periphery of the stopper 80 is a circular shape in a plan view.

The stopper 80 is provided at its center with an attaching hole 80a for insertion of the inner sleeve 10 thereinto and is formed in an annular shape. The center O of the annular stopper 80 coincides with the axis O of the inner sleeve 10 and the outer sleeve 20 with the stopper 80 fitted on the inner sleeve 10. The stopper 80 is constituted by a flexurally deformable material such as a rubber-like elastic body, for example.

The attaching hole 80a takes the quadrilateral shape with each side curved convexly toward a facing side. The stopper 80 is provided with first portions 81 and second portions 82 adjoining to the first portions 81 in the circumferential direction. The first portions 81 are regions each being around a peak of a convexly curved portion of the attaching hole 80a. Since at the first portions 81, a first distance R5 from the center O to the inner peripheral surface is almost the same as the outer radius R7 of the inner sleeve 10, the inner peripheral surfaces of the first portions 81 contact the outer peripheral surface 10b so that the first portions 81 hold the inner sleeve 10 in the radial directions. Since the first distance R5 to the first portions 81 is set to be smaller than the maximum diameter R1 of the first diameter expansion portion 13, the first diameter expansion portion 13 makes the stopper 80 difficult to come off the first end 11 of the inner sleeve 10.

The second portions 82 are regions where the attaching hole 80a does not contact the outer peripheral surface 10b. At the second portions 82, a second distance from the center O to the inner peripheral surface is larger than the first distance R5 to the first portions 81. Similarly to the first to third embodiments, the first portions 81 and the second portions 82 enable the stopper 80 to be flexurally deformed by the good use of dimensional difference between the first distance R5 and the second distance, and thus, the first diameter expansion portion 13 expanded in diameter beforehand at the first end 11 of the inner sleeve 10 can be made to be easily inserted into the attaching hole 80a. As a result, since it is possible to preclude the restriction on the order of the expansion step of foaming the first diameter expansion portion 13 and the insertion step of attaching the stopper 80 onto the inner sleeve 10, an improvement can be made in the degree of freedom of the order of the manufacturing steps for the antivibration device.

A maximum value R10 of the second distance to the second portions 82 is set to be larger than the maximum radius R1 of the first diameter expansion portion 13. Thus, with two adjoining points of the four points of the first portions 81 held in contact with the outer peripheral surface 10b of the inner sleeve 10, the first diameter expansion portion 13 is inserted into the attaching hole 80a while the stopper 80 is stretched in the radial direction, and thus, two remaining points of the first portions 81 can be made to contact the outer peripheral surface 10b. In comparison with the case that the inner peripheral side of the stopper 80 is flexurally deformed in the axial direction of the inner sleeve 10 to attach the stopper 80 onto the inner sleeve 10, the way of flexurally deforming the stopper 80 in the radial directions to attach the stopper 80 onto the inner sleeve 10 can make small the force required to attach the stopper 80. As a result, since the first diameter expansion portion 13 can be made to be easily inserted into the attaching hole 80a, an improvement can be made in the workability at the insertion step of inserting the first diameter expansion portion 13 into the attaching hole 80a.

Figure 7B:
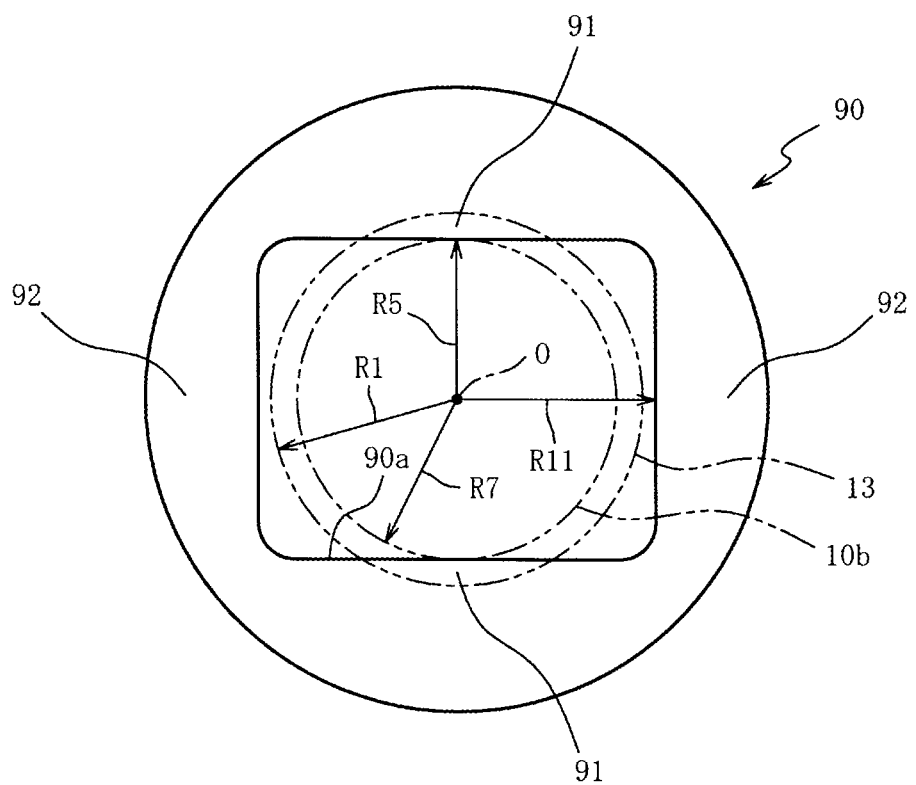
FIG. 7B is a plan view of a stopper in a fifth embodiment.

Next, a fifth embodiment will be described with reference to FIG. 7B. In the first embodiment, description has been made regarding the example wherein the attaching hole 40a of the stopper 40 is a circular shape in a plan view. In the fifth embodiment, on the contrary, description will be made regarding an example wherein an attaching hole 90a of a stopper 90 is a rectangular shape in a plan view. Incidentally, portions identical to those in the first embodiment will be given the same reference numerals and will hereafter be omitted from being described. FIG. 7B is a plan view of the stopper 90 in the fifth embodiment. In FIG. 7B, the first diameter expansion portion 13 at the first end 11 and the outer peripheral surface 10b of the inner sleeve 10 are shown by two-dot-chain lines.

The stopper 90 shown in FIG. 7B is an annular region. Like the stopper 40 in the first embodiment, the stopper 90 cushions the collision of the outer sleeve 20 and the bracket 6 moved relative to the inner sleeve 10 with the mating member 2. The outer periphery of the stopper 90 is a circular shape in a plan view.

The stopper 90 is provided at its center with the attaching hole 90a for insertion of the inner sleeve 10 thereinto and is formed in an annular shape. The center O of the annular stopper 90 coincides with the axis O of the inner sleeve 10 and the outer sleeve 20 with the stopper 90 fitted on the inner sleeve 10. The stopper 90 is constituted by a flexurally deformable material such as a rubber-like elastic body, for example.

The attaching hole 90a is formed in a rectangular shape in a plan view. The stopper 90 is provided with first portions 91 and second portions 92 adjoining to the first portions 91 in the circumferential direction. The first portions 91 are central portions along the long sides of the attaching hole 90a taking the rectangular shape. Since at the first portions 91, a first distance R5 from the center O to the inner peripheral surface is almost the same as the outer radius R7 of the inner sleeve 10, the inner peripheral surfaces of the first portions 91 contact the outer peripheral surface 10b so that the first portions 91 put the inner sleeve 10 therebetween. Since the first distance R5 from the center O to inner peripheral surfaces of the first portions 91 is set to be smaller than the maximum diameter R1 of the first diameter expansion portion 13, the first diameter expansion portion 13 makes the stopper 90 difficult to come off the first end 11 of the inner sleeve 10.

The second portions 92 are regions where the attaching hole 90a does not contact the outer peripheral surface 10b. At the second portions 92, a second distance from the center O to the inner peripheral surface is larger than the first distance R5 to the first portions 91. Similarly to the first to fourth embodiments, the first portions 91 and the second portions 92 enable the stopper 90 to be flexurally deformed by the good use of dimensional difference between the first distance R5 and the second distance, and thus, the first diameter expansion portion 13 expanded in diameter beforehand at the first end 11 of the inner sleeve 10 can be made to be easily inserted into the attaching hole 90a. As a result, since it is possible to preclude the restriction on the order of the expansion step of foaming the first diameter expansion portion 13 and the insertion step of attaching the stopper 90 onto the inner sleeve 10, an improvement can be made in the degree of freedom of the order of the manufacturing steps for the antivibration device.

Of the second distances, a portion R11 orthogonal to a direction in which two places of the first portions 91 face each other is set to be larger than the maximum radius R1 of the first diameter expansion portion 13. Thus, with one place of two places of the first portions 91 contacted with the outer peripheral surface 10b of the inner sleeve 10, the first diameter expansion portion 13 is inserted into the attaching hole 90a while the stopper 90 is stretched in the radial directions, and thus, one remaining place of the first portions 91 can be brought into contact with the outer peripheral surface 10b. In comparison with the case that the inner peripheral side of the stopper 90 is flexurally deformed in the axial direction of the inner sleeve 10 to attach the stopper 90 onto the inner sleeve 10, the way of flexurally deforming the stopper 90 in the radial directions to attach the stopper 90 onto the inner sleeve 10 can make small the force required to attach the stopper 90. As a result, since the first diameter expansion portion 13 can be made to be easily inserted into the attaching hole 90a, an improvement can be made in the workability at the insertion step of inserting the first diameter expansion portion 13 into the attaching hole 90a.

Hereinabove, the present invention has been described based on the embodiments. However, the present invention is not in any way limited to the foregoing respective embodiments, and it can easily be inferred that various modifications for improvements are possible without departing from the gist of the present invention. For example, the shapes of the inner sleeve 10, the outer sleeve 20, the antivibration base body 30, the stopper 40, 60, 71, 80, 90, the attaching hole 40a, 60a, 71a, 80a, 90a thereof, the slits 47, 65 and the like are one example and may as a matter of course take various shapes. For example, without being limited to the circular shape, the outer periphery of the stopper in a plan view is possible to be formed in a polygon shape, an elliptic shape or the like. Incidentally, in this case, "radially outside of the stopper" and "radially inside of the stopper" in the foregoing respective embodiments are replaced by "on the side remote from the center O" and "on the center O side", respectively.

Although the foregoing first embodiment has been described in the case that the antivibration device 1 is provided in a suspension system of a motor vehicle, this does not necessarily limit the present invention. It is as a matter of course possible to apply the present invention to a device in which vibration transmission from a vibration source side to a vibration receiving side is required to be controlled. Further, the application is as a matter of course possible not only to the use for motor vehicles, but also to various industrial machinery and the like.

In the foregoing first embodiment, description has been made regarding the example wherein the second diameter expansion portion 14 is provided on the second end 12 side of the inner sleeve 10. However, the present invention is not necessarily limited to this example. It is as a matter of course possible to omit the second diameter expansion portion 14 and to form the second end 12 side in parallel to the axis O.

Further, it is also possible to omit the restriction portion 32 and the flange 23. In the case of the restriction portion 32 omitted, in addition to inserting the first diameter expansion portion 13 into the attaching hole 40a, the second diameter expansion portion 14 may also be inserted into the attaching hole 40a, in which case the stopper 40 may be attached to each of the first end 11 side and the second end 12 side of the inner sleeve 10.

In the foregoing first embodiment, description has been made regarding the example wherein the first end 11 side and the second end 12 side of the inner sleeve 10 coupled by the antivibration base body 30 to the outer sleeve 20 are expanded in diameter by the contact pressuring tool 50 to form the first diameter expansion portion 13 and the second diameter expansion portion 14. However, the present invention is not necessarily limited to this example. It is possible as a matter of course to vulcanize the antivibration base body 30 with the first diameter expansion portion 13 and the second diameter expansion portion 14 formed in advance, so that the inner sleeve 10 is coupled to the outer sleeve 20. Further, it is possible to form the first diameter expansion portion 13 and the second diameter expansion portion 14 by the use of any other equipment or device than the contact pressuring tool 50, and it is also possible to form the first diameter expansion portion 13 and the second diameter expansion portion 14 at the same time as the forming of the inner sleeve 10.

In the foregoing first embodiment, description has been made regarding the example wherein the opposite ends of the inner sleeve 10 are respectively the first diameter expansion portion 13 and the second diameter expansion portion 14. However, the present invention is not necessarily limited to this example. It is possible as a matter of course that the first diameter expansion portion 13 is provided at the first end 11 side with a cylindrical portion parallel to the axis O or a portion whose outer peripheral surface is reduced in diameter toward the first end 11. It is also possible to provide these configurations on the second end 12 side of the second diameter expansion portion 14.

In the foregoing first embodiment, description has been made regarding the example wherein the first diameter expansion portion 13 and the second diameter expansion portion 14 are expanded in diameter at the inner peripheral surfaces 13a, 14a and the outer peripheral surfaces 13b, 14b respectively toward the first end 11 and the second end 12. However, the present invention is not necessarily limited to this example. At least the outer peripheral surfaces 13b, 14b suffice to be expanded in diameter respectively toward the first end 11 and the second end 12. For example, it is possible to reduce the inner peripheral surfaces of the first diameter expansion portion 13 and the second diameter expansion portion 14 in diameter respectively toward the first end 11 and the second end 12.

In the foregoing third embodiment, description has been made regarding the example wherein the annular protruding portions 72, 73 are provided on the first end surface 41 of the stopper 71. However, the present invention is not necessarily limited to this example. It is possible as a matter of course to provide protruding portions of an elliptic annular shape or polygonal annular shape. Further, it is also possible to provide protruding portions intermittently in the circumferential direction of the stopper 71 or to provide a plurality of protrusions in the shape of dots or line segments.

In the foregoing first and second embodiments, description has been made regarding the example wherein the four slits 47, 65 are provided. However, the present invention is not necessarily limited to this example. The number of the slits 47, 65 are suitably alterable. Further, the lengths of the slits 47, 65 are also suitably alterable. Incidentally, the more the number of the slits or the longer the slits are, the easier the respective first portions between the slits can be flexurally deformed. Further, without being limited to the case that the slits 47, 65 are provided in the radial directions of the annular stoppers 40, 60, the slits suffice to be provided in directions away from the center O of the attaching hole 40a, 60a. For example, it is possible to provide the slits extending in directions crossing the radial directions of the stoppers 40, 60.

Description has been made regarding the example wherein the foregoing first embodiment is provided with two circumferential groove portions including the first circumferential groove portion 43 and the second circumferential groove portion 44 and wherein the foregoing second embodiment is provided with the single circumferential groove portion 61. However, the present invention is not necessarily limited to these examples. The number of the circumferential groove portions is suitably alterable. Without being limited to the case that the circumferential groove portions are the same in radial position as the axial end portion 21 of the outer sleeve 20 and the corner 6a of the bracket 6, the positions of the circumferential groove portions are suitably alterable. Further, the radial groove portions 62 are also suitably alterable in number, positions, length and the like.

Further, without being limited to the example wherein the circumferential groove portions are grooves of the annular shape, it is possible to provide the circumferential groove portions intermittently over the whole circumference of the stopper 40, 60. Furthermore, the circumferential groove portion on the first end surface 41 side and the circumferential groove portion on the second end surface 42 side may be connected to form the circumferential groove portions as through holes.

In the foregoing respective embodiments, description has been made regarding the examples wherein the inner peripheral surface of the first portion 45, 63, 74, 81, 91 contacts the outer peripheral surface 10b of the inner sleeve 10 so that the first portion 45, 63, 74, 81, 91 holds the inner sleeve 10. However, the present invention is not necessarily limited to these examples. By setting the first distance R5 to be larger than the outer radius R7 of the inner sleeve 10, it is possible to make the first portion out of contact with the outer peripheral surface 10b or to make the first portion contact with the outer peripheral surface 13b of the first diameter expansion portion 13 so that the first portion holds the first diameter expansion portion 13.

In the foregoing first embodiment, description has been made regarding the example wherein between the first diameter expansion portion 13 and the second diameter expansion portion 14, the inner sleeve 10 has the inner peripheral surface 10a and the outer peripheral surface 10b being parallel to the axis O. However, the present invention is not necessarily limited to this example. For example, it is possible to project the whole circumference at the axial center of the inner sleeve 10 radially outward or to protrude a part in the circumferential direction at the axial center of the inner sleeve 10 radially outward.

Further, it is possible to combine a part or the whole of any of the foregoing embodiments with a part or the whole of another embodiment. Further, it is also possible to omit a part of the construction in each of the foregoing embodiments. For example, it is possible as a matter of course to apply the first circumferential groove portion 43 and the second circumferential groove portion 44 in the foregoing first embodiment to the stoppers 80, 90 in the fourth and fifth embodiments. Further, it is possible to apply the radial groove portion 62 in the second embodiment to the stoppers 40, 71, 80, 90 in the first and third to fifth embodiments.

The invention claimed is:

1. An antivibration device comprising:
an inner sleeve having a first end and a second end in an axial direction and having a diameter expansion portion being annular in a radial section, the diameter expansion portion being expanded in diameter toward the first end at an outer peripheral surface on the first end side;
an outer sleeve disposed on an outer peripheral side of the inner sleeve;
an antivibration base body constituted by a rubber-like elastic body and coupling an outer peripheral surface of the inner sleeve to an inner peripheral surface of the outer sleeve; and
an annular stopper being flexurally deformable and having at its center an attaching hole into which the first end side of the inner sleeve is inserted;
wherein the stopper is equipped with:
a first portion where a first distance from the center of the attaching hole to an inner peripheral surface of the attaching hole is set to be smaller than a maximum value of an outer radius of the diameter expansion portion; and
a second portion where a second distance from the center to the inner peripheral surface of the attaching hole is set to be larger than the first distance,
wherein the second distance is larger than the maximum value of an outer radius of the diameter expansion portion.

2. The antivibration device according to claim 1, wherein:
the attaching hole is equipped with a plurality of slits which are provided to extend in directions away from the center and which divides an inner peripheral side of the stopper in a circumferential direction;
the first portion includes regions between the slits; and
the second portion is a region being on a side remote from the center beyond the slits.

3. An antivibration device comprising:
an inner sleeve having a first end and a second end in an axial direction and having a diameter expansion portion being annular in a radial section, the diameter expansion portion being expanded in diameter toward the first end at an outer peripheral surface on the first end side;
an outer sleeve disposed on an outer peripheral side of the inner sleeve;
an antivibration base body constituted by a rubber-like elastic body and coupling an outer peripheral surface of the inner sleeve to an inner peripheral surface of the outer sleeve; and
an annular stopper being flexurally deformable and having at its center an attaching hole into which the first end side of the inner sleeve is inserted;
wherein the stopper is equipped with:
a first portion where a first distance from the center of the attaching hole to an inner peripheral surface of the attaching hole is set to be smaller than a maximum value of an outer radius of the diameter expansion portion; and
a second portion where a second distance from the center to the inner peripheral surface of the attaching hole is set to be larger than the first distance,
wherein the stopper is equipped with a circumferential groove portion which is provided to be recessed on at least one of a first end surface on the first end side and a second end surface of the second end side and to extend in the circumferential direction.

4. The antivibration device according to claim 3, wherein the circumferential groove portion includes a first circumferential groove portion which is provided on the second end surface and which faces an axial end portion on the first end side of the outer sleeve in the axial direction of the outer sleeve.

5. The antivibration device according to claim 3, wherein the circumferential groove portion includes a second circumferential groove portion which is provided on the second end surface and which is on a radially outer side than the outer sleeve.

6. The antivibration device according to claim 3, wherein the circumferential groove portion is provided on the first end surface and the second end surface at the same position.

7. The antivibration device according to claim 3, wherein:
the circumferential groove portion is provided on the second end surface;
the stopper is equipped with a protruding portion protruding from the first end surface; and
the protruding portion is disposed to be shifted in the radial direction relative to the circumferential groove portion.

8. The antivibration device according to claim 1, wherein the stopper is equipped with a radial groove portion which is provided to be recessed on at least one of the first end surface on the first end side and the second end surface on the second end side and to extend in a direction away from the center.

9. The antivibration device according to claim 1, wherein the antivibration base body is non-adherent to the diameter expansion portion.

10. The antivibration device according to claim 1, further comprising an annular flange radially protruding from an axial end on the second end side of the outer sleeve; wherein:
the diameter expansion portion has an outer radius whose maximum value is set to be smaller than an outer radius of the outer sleeve; and
the stopper has an outer peripheral surface whose maximum value of a distance from the center is set to be larger than an outer radius of the outer sleeve.

11. The antivibration device according to claim 1, wherein the attaching hole is formed in an elliptic shape.

12. The antivibration device according to claim 1, wherein the attaching hole takes a quadrilateral shape with each side curved convexly toward a facing side.

13. The antivibration device according to claim 1, wherein the attaching hole is formed in a rectangular shape.

* * * * *